United States Patent [19]

Beasley

[11] 4,222,664
[45] Sep. 16, 1980

[54] FIBRE OPTIC CABLE TERMINATION TESTING

[75] Inventor: Robin D. Beasley, Chatham, England

[73] Assignee: Elliott Brothers (London) Limited, Chelmsford, England

[21] Appl. No.: 944,194

[22] Filed: Sep. 20, 1978

[30] Foreign Application Priority Data

Sep. 26, 1977 [GB] United Kingdom ............... 39909/77

[51] Int. Cl.² ............................................ G01N 21/00
[52] U.S. Cl. ................................... 356/73.1; 356/239; 356/394
[58] Field of Search ...................... 356/73.1, 237, 239, 356/394; 350/96.20, 96.21, 96.22

[56] References Cited

U.S. PATENT DOCUMENTS 3,999,841  12/1976  Dakss et al. ...................... 350/96.21

Primary Examiner—Vincent P. McGraw
Attorney, Agent, or Firm—Kirschstein, Kirschstein, Ottinger & Cobrin

[57] ABSTRACT

A method and apparatus for testing a ferruled termination of a fibre optic cable by illuminating the active optical area of the cable at the end of the cable remote from the termination and successively measuring through a series of apertures of different area aligned with the ferrule the light energy output from said termination. The apertures may be provided by a series of apertures in a plate or may be provided by a shutter having an opening which may be discretely set to each of the apertures.

11 Claims, 3 Drawing Figures

FIBRE OPTIC CABLE TERMINATION TESTING

This invention relates to the testing of terminated fibre optic cables. The term "fibre optic cable" is used to encompass both single and multi-fibre cables.

Terminations are required to be made in fibre optic cables when, inter alia, a cable is required to be joined to another cable or to a terminal. Conventionally such a termination is made by crimping the end of the cable into a ferrule. In the case of a joint the ferrule is then placed in a cooperating optical connector which holds the ferrule in axial alignment with the ferrule of a similar termination of another cable. It will be appreciated that for an optimum optical joint the active optical area of each termination should be of good quality, i.e. low attenuation, should form a circle co-axial with its ferrule and the active optical areas should overlap. It will be appreciated that in order to enable the termination of any one cable to be jointed with the termination of any other cable, the circle formed by the active optical area of any termination should preferably be of a standard size.

Conventionally, only the attenuation, i.e. the quality of the active optical area, of a termination has been tested, leaving the size, shape and position of the active optical area of the termination untested.

It is an object of the present invention to provide a method of and an apparatus for testing a ferruled termination of a fibre optic cable, whereby the size, shape, position and quality of the active optical area of the termination may be tested.

According to a first aspect of the invention there is provided a method of testing a ferruled termination of a fibre optic cable comprising the steps of:

illuminating the active optical area of the cable at the end of said cable remote from said termination; and successively measuring through each of a series of restrictions each having an aperture of different area aligned with the ferrule the light energy output from said termination.

Preferably one of said apertures exposes an area substantially greater than that of the desired active optical area of said termination and another of said apertures exposes an area substantially less than the desired active optical area of said termination.

Preferably a different one of said apertures exposes an area just less than the desired active optical area of said termination.

Preferably each restriction has an aperture of the same shape as that of the desired active optical area of said termination.

According to a second aspect of the invention there is provided an apparatus for testing a ferruled termination of a fibre optic cable comprising: means for illuminating the active optical area of a termination at the end of said cable remote from said termination; means for successively restricting light output from said termination through a series of apertures each of different area and aligned with the ferrule; and means for measuring the light energy output through each said aperture.

Preferably said restricting means is so arranged as to expose to said measuring means through one of said apertures an area substantially greater than that of the desired active optical area of said termination and through another of said apertures an area substantially less than the desired active optical area of said termination.

Preferably said restricting means is further so arranged as to expose to said measuring means through a different one of said apertures an area just less than that of the desired active optical area of said termination.

Preferably said restricting means is so arranged that each said aperture is of the same shape as that of the desired active optical area of said termination.

Preferably there are provided means for locating said ferruled termination and said means for successively restricting light output from said termination includes a plate having a series of apertures therein and so arranged that each said aperture may be positioned in turn in the light path between said ferruled termination and said means for measuring the light energy output through each said aperture. The plate may conveniently be movable by rotation.

Alternatively said means for successively restricting the light output from said termination may include a shutter having an opening which may be discretely set to each of said series of apertures.

One apparatus and a method in accordance with the invention for testing a ferruled termination of a fibre optic cable for faults will now be described, by way of example only, with reference to the accompanying drawings, in which.

A ferruled termination is made in a fibre optic cable by terminating the cable at the desired point and crimping the terminated end of the cable into a circular ferrule. FIG. 1 shows end-on views of seven different internally illuminated such terminations.

Figure 1A:
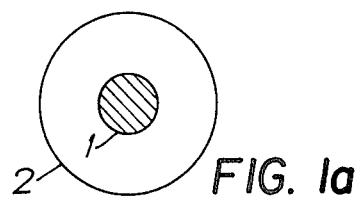
FIG. 1 shows end-on views of seven internally illuminated ferruled fibre optic cable terminations illustrating the types of faults which may occur.

The termination of FIG. 1(a) is a perfect termination since the active optical area 1 of the termination is of the correct size, correct circular shape and correct optical quality and is in correct axial alignment with the ferrule 2.

Figure 1B:
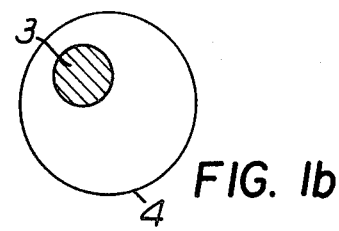

The termination of FIG. 1(b) is an imperfect termination since although the active optical area 3 of the termination is of the correct size, shape and optical quality, its axial alignment with the ferrule 4 is incorrect. Such a termination is said to be misaligned.

Figure 1C:
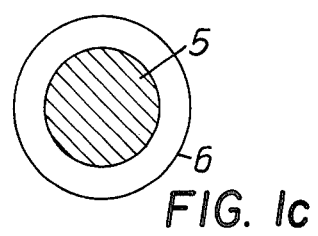
Figure 1D:
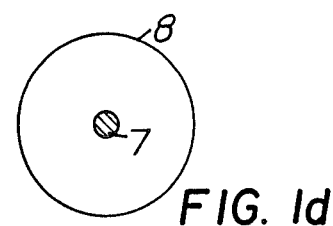

The terminations of FIGS. 1(c) and 1(d) are imperfect terminations since although the active optical areas 5, 7 of the terminations are of the correct shape, optical quality and axial alignment with their respective ferrules 6, 8, their sizes are respectively too large and too small. Such terminations are said to be under-crimped and over-crimped respectively.

Figure 1E:
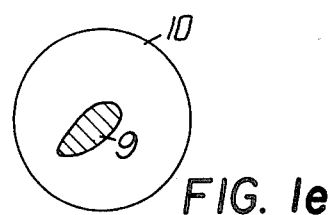

The termination of FIG. 1(e) is an imperfect termination since although the active optical area 9 of the termination is of the correct area, optical quality and axial alignment with the ferrule 10, its shape is incorrect. Such a termination is said to be deformed.

Figure 1F:
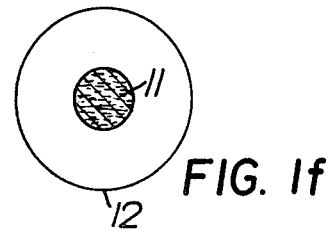
Figure 1G:
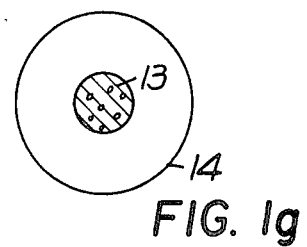

The terminations of FIGS. 1(f) and 1(g) are imperfect since although their active optical areas 11, 13 are of the correct size, shape and axial alignment with their respective ferrules 12, 14, their optical qualities are too low. In the termination of FIG. 1(f) this is due to the active optical area having a poor optical finish; and in FIG. 1(g) it is due to the active optical area 13 having broken optical fibres.

Figure 2:
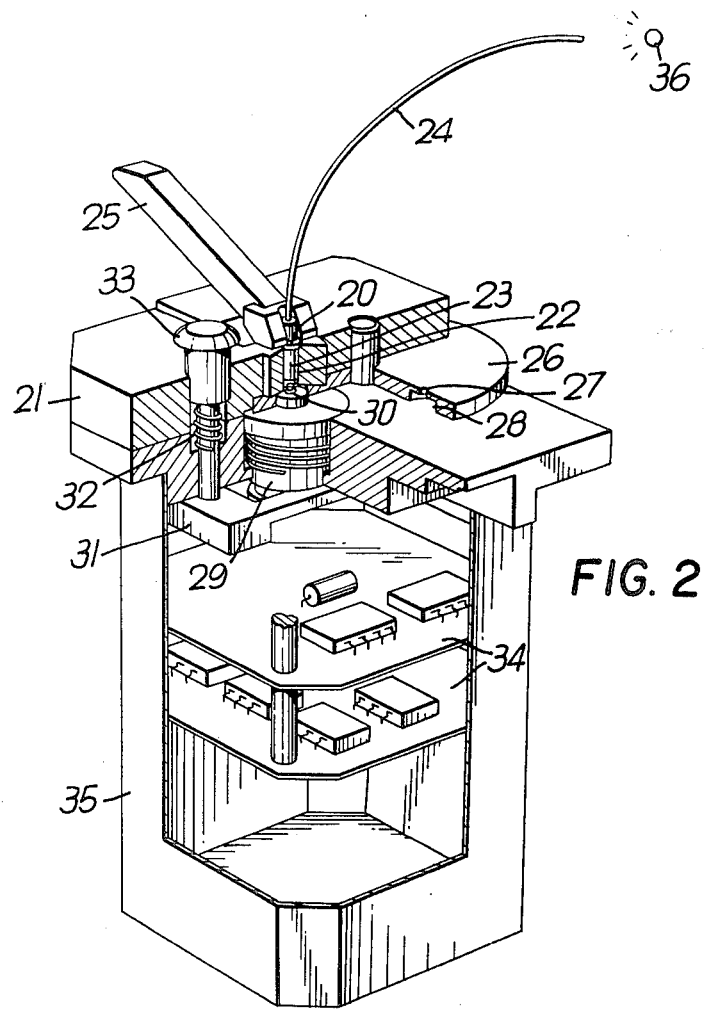
FIG. 2 shows a partly cut-away perspective view of an apparatus according to the invention.

Referring now to FIG. 2 the apparatus for testing a ferruled fibre optic cable termination for such faults includes a plate 21 through which there is provided a cylindrical aperture 22 arranged to receive the ferrule 23 of a ferruled termination of a fibre optic cable 24. The ferrule 23 is held in position by a spring-loaded retaining lever 25 acting against a shoulder 20 on the ferrule 23. Positioned beneath the plate 21 and aligned with the aperture 22 is a photo-sensitive diode (not shown).

Arranged between the aperture 22 and the photo-sensitive diode is a circular aperture plate 26. The aperture plate 26 is provided at spaced positions around the plate and at equal distances from the centre of the plate with three cylindrical apertures 27 of different diameter. The sizes of the three apertures 27 are so chosen that the diameter of the largest is substantially greater than that of the desired active optical area (see FIG. 1(a)), the diameter of the smallest is substantially less than that of the desired active optical area, and the diameter of the other aperture is just less than that of the desired active optical area. The aperture plate 26 is arranged to be turned by hand about an axis parallel to that of the aperture 22 such that each of the apertures 27 may be aligned in turn with the aperture 22. With each aperture 27 there is associated on the underside of the plate 26 one of three cylindrical recesses 28 of equal diameter substantially greater than that of the largest aperture 27. Each recess 28 is aligned with its respective aperture 27.

Between the aperture plate 26 and the photo-sensitive diode there is arranged an alignment plunger 29. The plunger 29 is provided centrally on its top with a cylindrical lug 30 of slightly smaller diameter than that of the recesses 28 in the underside of the aperture plate 26. The lug 30 and plunger 29 are provided with a cylindrical aperture through their centres to provide a conduit for light to the photo-sensitive diode. The plunger 29 is located in a frame 31 and the frame and plunger are together urged upwards by a spring 32 so as to maintain the lug 30 in a selected one of the recesses 28, and hence a selected aperture 27 in alignment with the aperture 22. By depressing a button 33 the frame 31 may be lowered, withdrawing the lug 30 from the recess 28, and allowing the aperture plate 26 to be turned and another of the apertures 27 to be selected.

The photo-sensitive diode is connected to processing circuitry 34 mounted in a casing 35. The termination at the other end of the fibre optic cable is arranged to be uniformly illuminated from a light source 36.

Figure 3A:
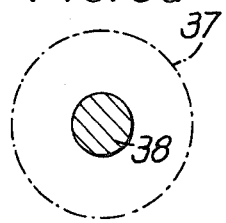
FIG. 3 illustrates successive stages in the method according to the invention in the use of the apparatus shown in FIG. 2.
Figures 3B, 3C:
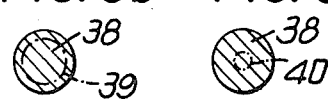

Referring now also to FIG. 3, in use of the apparatus of FIG. 2, the button 33 is depressed and the aperture plate 26 is rotated until the aperture 22 is aligned with the largest of the apertures 27, the button 33 then being released so that the lug 30 on the alignment plunger 29 engages the recess 28 associated with that aperture and so holds the two apertures in alignment. The periphery 37 of the largest aperture 27 would thus be aligned with a termination having a desired active optical area 38 as in FIG. 3(a). The apparatus is then calibrated with respect to a calibrated fibre optic cable to give a test null.

The calibrated cable is then replaced by the fibre optic cable 24 one of whose terminations is to be tested, the light source 36 being arranged to illuminate uniformly the fibre optic cable 24 at the end remote from the termination to be tested. The output of the photo-sensitive diode is compared in the processing circuitry 34 with the test null to give the total link attenuation figure of the cable 24, regardless of any type of shape, size or misalignment defect of the active optical area of the termination under test.

The attenuation figure of the cable 24 is then compared with its own length and attenuation/length specification, allowing such faults as broken fibres (FIG. 1(g)) and poor optical finish (FIG. 1(f)) in the active optical area of the termination under test to be detected.

The apparatus is then re-nulled to remove the effects of attenuation and the aperture plate 26 is turned until the next smallest aperture 27, whose diameter is just less than that of the desired active optical area, is aligned with the aperture 22. The periphery 39 of the next smallest aperture 27 would thus be aligned with a termination having a desired active optical area 38 as in FIG. 3(b). The attenuation figure of the termination is then calculated by the processing circuitry 34. If too great an increase in attenuation has occurred this is a consequence of too much light having been cut-off, which means that the termination is either under crimped (FIG. 1(c)), deformed (FIG. 1(e)) or misaligned (FIG. 1(b)).

The aperture plate 26 is then turned until the smallest aperture 27, whose diameter is substantially less than that of the desired active optical area, is aligned with the aperture 22. The periphery 40 of the smallest aperture 27 would thus be aligned with a termination having a desired active optical area 38 as in FIG. 3(c). The attenuation figure is again calculated. If too small an increase in attenuation has occurred this is a consequence of not enought light having been cut off, which means that the termination is over-crimped (FIG. 1(d)).

It will be appreciated that although the foregoing description has been made with reference to a series of restrictions being provided by a series of apertures in a plate, the series of restrictions may alternatively be provided by a shutter having an opening which may be discretely set to each of said series of apertures.

What I claim is:

1. A method of testing a ferruled termination of a fibre optic cable comprising the steps of:
    illuminating the active optical area of the cable at the end of said cable remote from said termination; and
    successively measuring through each of a series of restrictions each having an aperture of different area aligned with the ferrule the light energy output from said termination.

2. A method according to claim 1 wherein one of said apertures exposes an area substantially greater than that of the desired active optical area of said termination and another of said apertures exposes an area substantially less than the desired active optical area of said termination.

3. A method according to claim 2 wherein a different one of said apertures exposes an area just less than the desired active optical area of said termination.

4. A method according to claim 1 wherein each said restriction has an aperture of the same shape as that of the desired active optical area of said termination.

5. An apparatus for testing a ferruled termination of a fibre optic cable comprising:
    means for illuminating the active optical area of a termination at the end of said cable remote from said termination;
    means for successively restricting light output from said termination through a series of apertures each of different area and aligned with the ferrule; and
    means for measuring the light energy output through each said aperture.

6. An apparatus according to claim 5 wherein said restricting means is so arranged as to expose to said measuring means through one of said apertures an area substantially greater than that of the desired active optical area of said termination and through another of said apertures an area substantially less than the desired active optical area of said termination.

7. An apparatus according to claim 6 wherein said restricting means is so arranged as to expose to said measuring means through a different one of said apertures an area just less than the desired active optical area of said termination.

8. An apparatus according to claim 5 wherein said restricting means is so arranged that each said aperture is of the same shape as that of the desired active optical area of said termination.

9. An apparatus according to claim 5 having means for locating said ferruled termination and wherein said means for successively restricting light output from said termination includes a plate having said series of apertures therein and so arranged that each said aperture may be positioned in turn in the light path between said ferruled termination and said means for measuring the light energy output through each said aperture.

10. An apparatus according to claim 9 wherein said plate is movable by rotation so that each said aperture may be positioned in turn in the light path between said ferruled termination and said means for measuring the light energy output through each said aperture.

11. An apparatus according to claim 5 wherein said means for successively restricting the light output from said termination includes a shutter having an opening which may be discretely set to each of said series of apertures.

* * * * *